FIG. 1 (PRIOR ART) GRAY OR REFLECTED BINARY CODING MASK, FIG. 1A (PRIOR ART) CONVENTIONAL BINARY CODING MASK
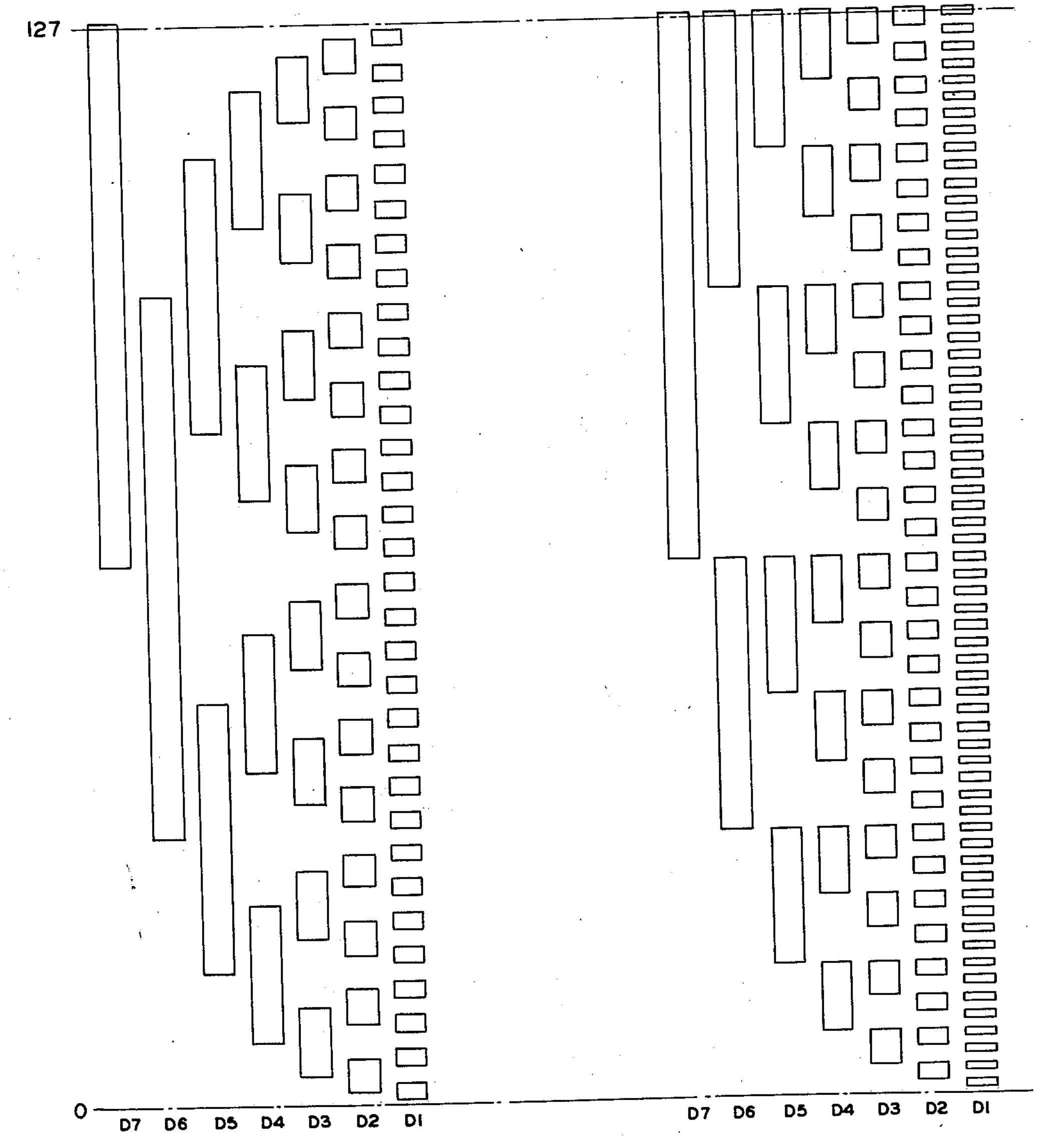
INVENTOR
W. S. HAZLETT
BY
John E. Cassidy
ATTORNEY

FIG. 2

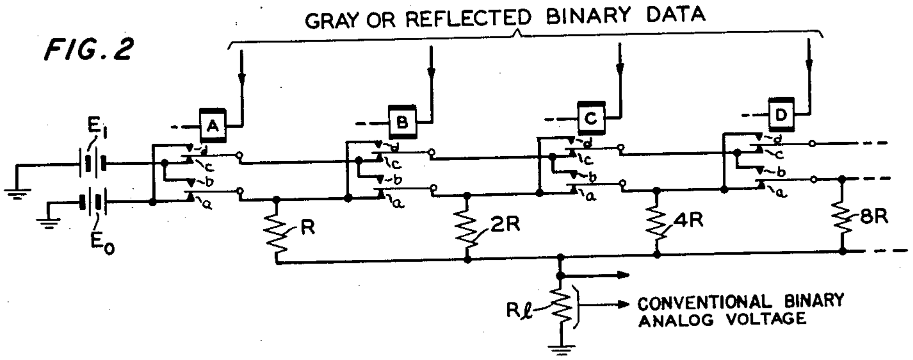

FIG. 3

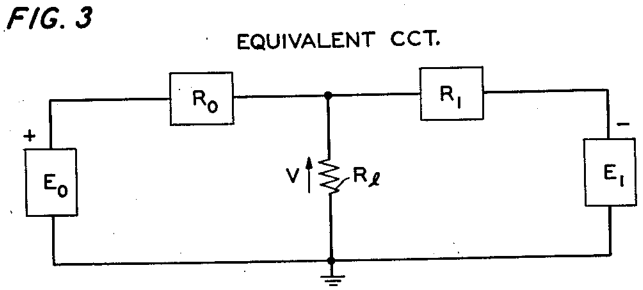

FIG. 4

| NUMBER | GRAY OR REFLECTED BINARY CODE DIGIT VALUES ±15±7±3±1 | CONVENTIONAL BINARY CODE DIGIT VALUES $2^3 2^2 2^1 2^0$ | RELAYS OPERATED BY GRAY CODE | POTENTIAL $E_0$ CONNECTED TO RESISTORS IN PARALLEL | POTENTIAL $E_1$ CONNECTED TO RESISTORS IN PARALLEL |
|---|---|---|---|---|---|
| 0 | 0000 | 0000 | NONE | R, 2R, 4R, 8R | NONE |
| 1 | 0001 | 0001 | D | R, 2R, 4R | 8R |
| 2 | 0011 | 0010 | CD | R, 2R, 8R | 4R |
| 3 | 0010 | 0011 | C | R, 2R | 4R, 8R |
| 4 | 0110 | 0100 | BC | R, 4R, 8R | 2R |
| 5 | 0111 | 0101 | BCD | R, 4R | 2R, 8R |
| 6 | 0101 | 0110 | B D | R, 8R | 2R, 4R |
| 7 | 0100 | 0111 | B | R | 2R, 4R, 8R |
| 8 | 1100 | 1000 | AB | 2R, 4R, 8R | R |
| 9 | 1101 | 1001 | AB D | 2R, 4R | R, 8R |
| 10 | 1111 | 1010 | ABCD | 2R, 8R | R, 4R |
| 11 | 1110 | 1011 | ABC | 2R | R, 4R, 8R |
| 12 | 1010 | 1100 | A C | 4R, 8R | R, 2R |
| 13 | 1011 | 1101 | A CD | 4R | R, 2R, 8R |
| 14 | 1001 | 1110 | A D | 8R | R, 2R, 4R |
| 15 | 1000 | 1111 | A | NONE | R, 2R, 4R, 8R |

INVENTOR
W. S. HAZLETT
BY
John E. Cassidy
ATTORNEY

FIG. 5

| NUMBER | $R_0$ VALUE OF RESISTORS CONNECTED TO $E_0$ | $R_1$ VALUE OF RESISTORS CONNECTED TO $E_1$ | $R_1 - R_0$ | $R_1 + R_0$ | $\frac{R_1 - R_0}{R_1 + R_0}$ | ANALOG VOLTAGE PRODUCED |
|---|---|---|---|---|---|---|
| 0 | $\frac{8}{15}R$ | $\infty R$ | $\infty R$ | $\infty R$ | $+1$ | $+E$ |
| 1 | $\frac{4}{7}R$ | $8R$ | $+7\frac{3}{7}R$ | $8\frac{4}{7}R$ | $+\frac{13}{15}$ | $+\frac{13}{15}E$ |
| 2 | $\frac{8}{13}R$ | $4R$ | $+3\frac{5}{13}R$ | $4\frac{8}{13}R$ | $+\frac{11}{15}$ | $+\frac{11}{15}E$ |
| 3 | $\frac{2}{3}R$ | $2\frac{2}{3}R$ | $+2R$ | $3\frac{1}{3}R$ | $+\frac{9}{15}$ | $+\frac{9}{15}E$ |
| 4 | $\frac{8}{11}R$ | $2R$ | $+1\frac{3}{11}R$ | $2\frac{8}{11}R$ | $+\frac{7}{15}$ | $+\frac{7}{15}E$ |
| 5 | $\frac{4}{5}R$ | $1\frac{3}{5}R$ | $+\frac{4}{5}R$ | $2\frac{2}{5}R$ | $+\frac{5}{15}$ | $+\frac{5}{15}E$ |
| 6 | $\frac{8}{9}R$ | $1\frac{1}{3}R$ | $+\frac{4}{9}R$ | $2\frac{2}{9}R$ | $+\frac{3}{15}$ | $+\frac{3}{15}E$ |
| 7 | $1R$ | $1\frac{1}{7}R$ | $+\frac{1}{7}R$ | $2\frac{1}{7}R$ | $+\frac{1}{15}$ | $+\frac{1}{15}E$ |
| 8 | $1\frac{1}{7}R$ | $1R$ | $-\frac{1}{7}R$ | $2\frac{1}{7}R$ | $-\frac{1}{15}$ | $-\frac{1}{15}E$ |
| 9 | $1\frac{1}{3}R$ | $\frac{8}{9}R$ | $-\frac{4}{9}R$ | $2\frac{2}{9}R$ | $-\frac{3}{15}$ | $-\frac{3}{15}E$ |
| 10 | $1\frac{3}{5}R$ | $\frac{4}{5}R$ | $-\frac{4}{5}R$ | $2\frac{2}{5}R$ | $-\frac{5}{15}$ | $-\frac{5}{15}E$ |
| 11 | $2R$ | $\frac{8}{11}R$ | $-1\frac{3}{11}R$ | $2\frac{8}{11}R$ | $-\frac{7}{15}$ | $-\frac{7}{15}E$ |
| 12 | $2\frac{2}{3}R$ | $\frac{2}{3}R$ | $-2R$ | $3\frac{1}{3}R$ | $-\frac{9}{15}$ | $-\frac{9}{15}E$ |
| 13 | $4R$ | $\frac{8}{13}R$ | $-3\frac{5}{13}R$ | $4\frac{8}{13}R$ | $-\frac{11}{15}$ | $-\frac{11}{15}E$ |
| 14 | $8R$ | $\frac{4}{7}R$ | $-7\frac{3}{7}R$ | $8\frac{4}{7}R$ | $-\frac{13}{15}$ | $-\frac{13}{15}$ |
| 15 | $\infty R$ | $\frac{8}{15}R$ | $-\infty R$ | $+\infty R$ | $-1$ | $-E$ |

INVENTOR
W. S. HAZLETT

BY John E. Cassidy
ATTORNEY

United States Patent Office 2,973,510
Patented Feb. 28, 1961

2,973,510
CODE CONVERTER

William S. Hazlett, Bellaire, Tex., assignor to Bell Telephone Laboratories, Incorporated, New York, N.Y., a corporation of New York Filed Sept. 30, 1955, Ser. No. 537,697
5 Claims. (Cl. 340—347)

This invention relates to the translation of signal combinations expressed in accordance with a first code into corresponding combinations expressed in accordance with a second code.

As is well known in the communication signaling art occasions arise when it is desirable to translate signals expressed in one code, into signals expressed in another code. For instance, in telegraph communication, because of the limitation in the speed with which signals may be effectively transmitted through submarine cable, as a result of the effect of the large distributed capacitance of such a cable, the relatively higher reversal speed of multielement two-condition signals employed on a land line connected to the cable is reduced by translating say five-element two-condition signals into three-element three-condition signals which latter are impressed on the cable.

There are other situations which recommend translation from one code to another. For instance, in the encoding of multielement signal combinations defining a quantity as measured by a displaceable element, such as a rotatable wheel, the use of the conventional binary code, due to the limitations of the encoding apparatus, may produce very large encoding errors during transitions between successive positions of the wheel. To prevent this, there has been produced a modified binary code, known as the reflected binary, or Gray code, as it will hereinafter be designated. The measurements are therefore first expressed in terms of the Gray code and thereafter, because of certain advantages inherent in the conventional binary code for other purposes, the Gray combinations are translated into conventional binary combinations. In yet another form of translation, which is the one with which the present invention is concerned, a received signal combination in Gray code is translated into a voltage analog in conventional binary code. The conventional binary analog voltage may be employed advantageously to control a servo-mechanism or to actuate a meter to indicate a quantity.

An object of the invention is the improvement of signal encoding systems.

A more particular object of the invention is the translation of Gray binary code signal combinations into corresponding conventional binary code voltage analogs.

In a sense, code translation is always a burden imposed by the particular conditions. The necessary translating equipment is an additional expense superimposed on the normal expense of the signaling system. It is desirable that the translating equipment be reduced to the minimum possible number of elements to lessen this burden. The present invention effects the translation of Gray code signal combinations into analog voltages of corresponding conventional binary code signal combinations by means of a very few apparatus elements, which may in fact be the minimum number of apparatus elements by means of which such translation can be effected.

In the present arrangement the translation is effected by means of a single relay having two sets of transfer contacts and a single resistor for each of the signal elements of the multielement code combination. This has been made possible by perceiving what may be reasonably termed an obscure relationship between the corresponding combinations of the Gray and the conventional binary codes and designing a circuit based on the relationship.

Attention is particularly called to the fact that in the present relay circuit only two armatures are required to be actuated in each relay for each element of the multielement combinations. This is of importance, as a practical matter, because of the fact that in one of its important applications the present translator is to be employed in a high-speed radio telegraph signaling system in cooperation with thermionic tubes and transistor elements which are operable at high speeds. The only presently available relay, the speed of operation of which will not become a seriously limiting factor in the over-all speed of operation of the system, has but two armatures. If three or more armatures were required therefore to effect the conversion in each stage, a relay code converter would be unsuitable.

A feature of the present invention therefore is a circuit arrangement employing a high-speed relay requiring but two armatures for each signal element.

Another feature of the invention is a number of lumped resistors which are variably disposed as components of a potentiometer under control of relay contacts arranged to implement a unique relationship perceived to exist between code combinations of the Gray and conventional binary codes to translate Gray code combinations into analog voltages of conventional binary code combinations.

These and other features of the invention will become apparent from the following description when read with reference to the associated drawings which taken together disclose one preferred embodiment in which the invention is presently incorporated. It is to be understood however that the invention may be incorporated in other forms which may be suggested by the following to those skilled in the art.

In the drawings:

Fig. 1 is a diagram of a mask which may be used in generating reflected binary, or Gray code signal combinations;

Fig. 1A is a diagram of a mask which may be used in generating conventional binary code signal combinations;

Fig. 2 is the circuit which translates Gray code signal combinations into corresponding voltage analogs in conventional binary code;

Fig. 3 is the equivalent circuit of Fig. 2; and

Figs. 4 and 5 are tabulations used in explaining the invention.

Reference may be had to Patent 2,632,058 granted to F. Gray, March 17, 1953, for a description of the reflected or Gray binary code and Patent 2,632,058 is hereby incorporated herein by reference as though fully set forth herein.

As stated in the foregoing, the invention herein translates code combinations in accordance with the Gray binary code into analogs of voltages in accordance with corresponding combinations in the conventional binary code. In each of these codes, each signal element may be of either of two conditions and each combination has $n$ signal elements, where $n$ is a positive integer. Each code therefore affords $2^n$ distinctive code combinations. In Fig. 2, four relays are shown in full and the invention is described for a four-element code affording $2^4$ or 16 combinations and the explanatory tabulations in Figs. 4 and 5 apply specifically to the four relay arrangements of Fig. 2. In Fig. 2 conductors are shown extending toward the right which are intended to indicate that the method of translation of the invention is valid, as will become apparent from the description hereunder, for codes having a larger number of elements than four, without limit.

In Fig. 1 a diagram of a mask corresponding to a

Gray code having seven two-condition elements is indicated and in Fig. 1A a diagram of a mask corresponding to a conventional binary code having seven two-condition elements is indicated.

The object in showing masks for seven element rather than four-element codes is that the codes employed in practice frequently have seven and more elements and these masks more graphically illustrate a difficulty inherent in regular binary encoding which the present invention obviates.

Attention is called to the fact that, in each of Figs. 1 and 1A, the vertical column corresponding to the digit having greatest significance is shown at the left and the digits having lesser significance are shown progressively toward the right. In each figure, a mask for a two-condition code having two elements would correspond to the two left-hand vertical columns. A mask for a two condition code having three or four elements would include the third and the fourth vertical columns from the left, respectively, and so on. A rectangle in each of Figs. 1 and 1A indicates an apperture in the mask and a 1 in a code combination, and a blank in each vertical column represents an opaque section in the mask and a 0 in the code combination. It will be observed that the resultant codes of the masks for the four left-hand vertical columns conform to the codes for a four-digit Gray code and a four-digit conventional binary code as shown in the second and third tabulation from the left in Fig. 4. The number of columns may be extended to the right in each of Figs. 1 and 1A indefinitely as the number of signal elements in each code is increased by following the particular pattern shown in each figure.

A comparison of the relative adaptability of the Gray and conventional binary codes to the accurate expression of a quantity in terms of a code combination by means of an individual encoding device for each of the two codes may be made from reference to Fig. 1 and Fig. 1A. In each of these figures each individual code combination is represented by an individual transverse row and successive code combinations define successive integral numbers. In each figure the rectangles, as mentioned, may represent apertures in a displaceable opaque strip, forming a screen, through which an individual light beam for each vertical column is permitted to pass, as the rectangles in the strip come into registry with the fixed light beams, to actuate respective responsive elements. The light beams and the elements are not shown. It is to be understood that although the comparison herein is made with respect to masks, which are assumed to be in the forms of strips or tapes, the comparison is valid for masks in which corresponding perforations and opaque sections appear in concentric annular rings, or in other forms.

Each seven-element code per Fig. 1 and Fig. 1A would afford $2^7$ or 128 code combinations arranged in horizontal rows to define 128 quantities. The quantities may be numbered from 0 to 127 from bottom to top. The bottom combination in each of Figs. 1 and 1A has no aperture and defines 0. The top combination, which defines 127 in each figure, has an aperture in row D7 only in Fig. 1, and an aperture in each of rows D1 to D7, inclusive, in Fig. 1A.

Attention is called to the right-hand or least significant column in each of Figs. 1 and 1A. In this column in Fig. 1 there are 32 apertures. In the right-hand column in Fig. 1A there are 64 apertures. Assuming masks, such as a tape or a disc, the same size, the apertures in Fig. 1A can be only half the size of those in Fig. 1. The same condition applies to each of columns D2 to D6, inclusive, that is to say, there are half as many apertures having twice the size in each of these columns in Fig. 1 as in the corresponding column in Fig. 1A. The mask in Fig. 1 therefore is less expensive to manufacture than that of Fig. 1A, but what is more important, with respect to the accuracy of encoding, because of the differences in the patterns of the apertures, there is less probability of gross encoding errors in the arrangement of Fig. 1 than in that of Fig. 1A.

There is another contrast between the two codes observable from a comparison of Fig. 1 and Fig. 1A. Reference to Fig. 1 discloses that not more than one signal element of any combination changes in any transition from any combination defining any quantity to an adjoining combination defining a consecutive quantity. Further, it will be observed that in column D1 in Fig. 1, wherein the transitions are most frequent, each aperture and each blank between apertures, when engaged, remain engaged for two successive combinations, whereas in Fig. 1 there is a transition between each combination. A comparison between each of columns D2 to D6, inclusive, in each of the figures also indicates that, since there are half the number of apertures and blanks in each of these columns in Fig. 1 that there are in corresponding columns in Fig. 1A, there will be only half as many signal transitions for each of these columns in Fig. 1 as in Fig. 1A. This characteristic is important, for one reason, in that an advantage is thereby afforded in the control of devices which are responsive to the code combinations. When but a single element of a code combination changes, in transitions between combinations, the conditions of the devices, such as relays, thermionic tubes, transistors, etc., which are controlled by the non-changing elements of the particular combination being encoded, remain unchanged. The condition of the device responsive to the single changing element in the combination alone is changed. When more than one element of a multielement code combination changes in transitions between code combinations defining consecutive integers, it is necessary to actuate a device for each such changing element to define the new code combination. It is difficult, on a production basis, to manufacture elements which respond in exactly the same time. The times available for operation of such devices in a high-speed telegraph signaling system are short. The difficulty of manufacturing devices which take the same time to respond, within the tolerances permissible in high-speed telegraph systems, is almost insuperable. When more than one signal element changes between successive combinations, and the apparatus elements controlled by the changing signal elements are actuated erroneously in sequence rather than simultaneously, because of differences in time of response, a sequence of erroneous combinations is produced, rather than a single correct code combination. This is important in a high-speed system in certain contemplated applications of the present invention. The Gray code in which but a single element changes in a combination, as can be seen from the foregoing, promotes accuracy.

Coadunate with the foregoing is the advantage of reduced maintenance, particularly where, as in the present invention, magnetic relays are controlled responsive to the code combinations. It was explained in the foregoing that the number of transitions required for the arrangement in Fig. 1 is much less than the number for Fig. 1A. This reduces the number of required operations of the relays and also minimizes the speed with which they are required to operate. This results in less effort to maintain the relay contacts and in more reliable relay operation over longer intervals without maintenance. This factor, too, is important in certain applications.

In evaluating the quantity expressed by any combination in the conventional binary code, when the combinations are expressed in terms of 1's and 0's, as in the third tabulation from the left in Fig. 4, the value of any 1 is equal to 2 raised to a power depending on the position occupied by the 1. The 2 in the right-hand position in the combination has the exponent 0. In the second, third and fourth column, 2 has the exponent 1, 2 and 3, respectively. Remembering that any quantity raised to the 0 power has a value of 1, the numeral 1 in the right-hand column is equal to 1, in the second column from the right a 1 is equal to 2, in the third column from the right a 1 is equal to 4; and the fourth column from the right a 1 is equal to 8. 0's in the combination count for 0.

Referring to the tabulation in the third column from the left in Fig. 4, the top combination comprises four 0's and the binary number represented thereby is 0. The next combination, going down the column, has a 1 in the right-hand column and represents $2^0$ or 1. The third combination from the top has a 1 in the second position from the right and is equal to $2^1$ or 2. The fourth combination from the top has a 1 in the first column and a 1 in the second column and is equal to $2^1+2^0$ or $2+1$ which equals 3. Following this system it will be found that each of the binary code combinations shown in the third column from the left is equal to the number shown in the left-hand column.

Evaluation of the combinations in the Gray code is not so simple as evaluation of the combinations in the conventional binary code. One manner of evaluation of the 1's and the 0's which equates the numbers shown in the left-hand column in Fig. 4 to the combinations shown in the second column from the left is as follows.

In this evaluation of the Gray combinations, the values of the 1's are not determined entirely by their absolute position in the combination. The values are dependent upon whether a 1 occupies an odd or an even position in each particular sequence of 1's counting from the left-hand or most significant position. In this evaluation the first 1 appearing in a Gray code combination counting from the left or most significant position is positive and its value depends upon the actual position in the combination that it occupies. The 1's are assigned values of $\pm 15$, $\pm 7$, $\pm 3$ and $\pm 1$, and the value for zero is 0. In the top combination for the Gray code appearing in the second column from the left all four digits are 0. The value of the combination therefor would be 0. In the second combination from the top in the Gray code column the first 1 to appear is in the right-hand column and therefore counts as a $+1$, which corresponds to the numeral in the left-hand column in Fig. 4. In the succeeding combinations going down the tabulation, the third combination from the top has a 1 in the second column from the right which counts for a $+3$. The 1 in the right-hand column now counts for a $-1$. These two values added together algebraically give 2. In the next combination from the top the first and only 1 appears in the second column from the right and has a value of $+3$. In the next succeeding combination the first 1 appears in the second column from the left and has a value of $+7$. The next 1 has a value of $-3$ and the combination has a value of 4. In the sixth combination from the top the first 1 counting from the left has a value of $+7$, the next 1 has a value of $-3$ and the third 1 has a value of $+1$ giving the total value for the combination of 5. Following this system, each combination in the Gray code in the second tabulation from the left will have the values appearing in the left-hand column under Number, the 16 combinations from top to bottom being equivalent to 0 to 15, respectively.

A method of implementing the evaluation of Gray combinations as described in the foregoing would be to use one relay per digit with two transfers acting as a chain of reversing switches so as to select the proper polarity and a third transfer acting to apply either ground for a 0, or the proper polarity for a 1, to an evaluation resistance network weighted according to the number 1, 3, 7 and 15, etc., values. This would require a small high-speed relay having three transfers and there is no relay known in the art available to meet the requirements.

In the present invention a circuit arrangement is provided in which combinations in the Gray code are translated directly into analog voltages in the conventional binary code and the transformation is effected by a relay requiring only two transfers. A high-speed relay having only two transfers is available in the art for the present purpose.

Refer now to Fig. 2 which shows the circuit by means of which Gray combinations impressed on the relay windings produce analog voltages in accordance with the conventional binary code.

In this figure it is assumed that combinations in accordance with the Gray or reflected binary code are impressed on the windings of the four relays A, B, C and D. The condition corresponding to 1 in a code combination actuates the relay on which it is impressed. Relays on which a condition corresponding to a 0 in the code combination is impressed remain unoperated as shown. It is particularly pointed out that whereas only four relays are shown in Fig. 2, for implementing a four-element code, the invention is not so limited and there may be any number of relays employed to implement a code having any number of elements. In the arrangement in Fig. 2, relay A is controlled by the condition of the digit in the most significant position. Relays B, C and D are controlled by the conditions of progressively less significant digits, respectively.

Attention is now called to a relationship between the code combinations in the Gray binary code and the corresponding code combinations in the conventional binary code, on which relationship the present invention depends. This relationship makes it possible to implement the translation from the Gray code combination to an analog voltage of the corresponding conventional binary code combination with a single relay for each code element, each relay requiring only two armatures, each armature controlling an individual transfer contact combination, as in relays A, B, C and D in Fig. 2.

Attention has been called to the fact that in the Gray code only one digit changes in transitions between consecutive combinations. This digit is shown underlined in the Gray code tabulation in Fig. 4. Reference to the tabulations of the two codes in Fig. 4 indicates, that in progressing to a higher number in each translation between consecutive combinations in the conventional binary code, the condition of each element of the preceding conventional binary code combination in the position corresponding to the position of the changing element in the Gray code is reversed, as is the condition of each element to the right thereof or in less significant positions in the conventional binary code. That is to say, the changing element in the Gray code tabulation in Fig. 4, the underlined element, governs the positions of the elements of the corresponding conventional binary code combination which are reversed, but the reversals are with respect to the preceding conventional binary combination.

To illustrate the foregoing translation process, consider the two code combinations for number 1 in Fig. 4. In the Gray code tabulation the changing element, that is the single element in the Gray code which changes for number 1 with respect to the preceding Gray code combination for number 0, is the right-hand element. Following the rule proposed above, the element in the corresponding position in the conventional binary code combination for number 1 is reversed with respect to its condition in number 0 in the conventional binary code. In number 0, in the combination of the conventional binard code, the element in the right-hand position is 0. Therefore it becomes 1 in the conventional binary code for number 1. There are no other elements to be changed, since there are no elements to the right of the right-hand position of the combination. Consider number 2 in the tabulation. The changing element in the Gray combination in the tabulation is the second from the right. This requires that the elements in the two right-hand positions in the code combination for the digit 2 in the conventional binary code combination must be reversed with respect to the condition of each in the code combination for number 1 in the conventional binary code combination. In the two right-hand positions of the combination for number 1 in the conventional binary code, the elements are 0 1. Following the rule, these become 1 0 as shown in the table. It is considered that the operation of the rule with respect to the other combinations will be understood from the foregoing.

The manner in which the foregoing translation rule is made operational in a relay circuit will now be described with respect to Fig. 2.

Fig. 2 essentially is a variable potentiometer, the resistor components of the arms of which may be varied by a single relay for each element of the code. Each relay has two armatures only. Each armature is actuable between a break and a make contact, constituting a transfer contact combination. Each relay controls the disposition of its individual resistor in the arms of a potentiometer as well as the disposition of the resistors individual to the relays to the right thereof.

The resistor elements are switched under control of the relays to either of two arms of the potentiometer between potential $E_0$ and $E_1$. The magnitudes of the potential sources advantageously are equal. They are of opposite polarity and are connectable between ground and the opposite terminals of the potentiometer, as constituted by the switched resistors, with the potential sources in series aiding relationship. The resistors are designated R, 2R, 4R and 8R. The magnitudes of 2R, 4R and 8R are two, four and eight times R, respectively. It will be observed that the magnitudes of these resistors are in the ratio $2^0$, $2^1$, $2^2$ and $2^3$ but they are in inverse order with respect to magnitudes arranged in accordance with the conventional binary code. The load is represented by resistor $R_1$ and the magnitude of its resistance is inordinately high with respect to that of the other resistors.

Specifically, resistors R, 2R, 4R and 8R are controlled by relays A, B, C and D, respectively. Relays A, B, C and D are responsive to elements of decreasing significance in the code combinations in alphabetical sequence. The magnitudes of the resistors are chosen so that, when they are switched into circuits in a manner to be explained, they afford a sequence of analog voltage steps varying linearly for sequential conventional binary combinations so as to effectively control a meter, a servo motor, or other linearly controllable element. This will be made clear hereinafter.

Reference to Fig. 2 discloses that it operates in a manner to effect switching of the resistor components of the potentiometer in conformity with the code transition rule stated in the foregoing. Code combinations in accordance with the Gray code are impressed on relays A, B, C and D. On each transition from one number to the next higher number, a single relay will operate, since but a single element in the Gray code changes. The other three relays will remain in their same conditions as for the previous combination. The conventional binary code combination set up on the contacts of the relays for the last preceding combination will be changed by the operation of the single relay, so that the resistor element individual to the operated relay and the resistor element individual to each of the relays to the right of the operated relay are reversed with respect to their conditions in the last preceding conventional binary code combination in their association with either potential source $E_0$ or $E_1$ in the arms of the potentiometer.

The fourth column from the left in Fig. 4 shows the relays which are in the operated condition for any combination. The others are released. The condition of only one relay changes on each transition.

To illustrate the operation of Fig. 2, for the number 0 all four relays are released. A circuit may be traced from ground through potential source $E_0$ and contact *a* of each of relays A, B, C and D to the top terminals of resistors R, 2R, 4R and 8R and through the resistors in parallel, to the top terminal of the large magnitude load resistor $R_1$ and through resistor $R_1$ to ground. For this condition resistors R, 2R, 4R and 8R are connected in parallel in a series circuit extending from ground through potential source $E_0$, the parallel resistors and the large magnitude resistor $R_1$ to ground. Potential source $E_1$ is connected through contact *c* of each of relays A, B, C and D to an open circuit or to infinite resistance. For numeral 1 in the Gray code the right-hand element of the combination changes with respect to the Gray combination for number 0. Relay D operates. The others remain released. Resistor 8R controlled by relay D is switched from connection to potential source $E_0$ to potential source $E_1$. The potentiometer now comprises grounded potential source $E_0$ connected to resistors R, 2R and 4R, arranged in parallel, in series with resistor 8R and potential source $E_1$ to ground. Resistor $R_1$ is connected to the junction between resistors R, 2R and 4R arranged in parallel, and resistor 8R. For the next translation from the combination for number 1 to that for number 2 in the Gray code the second element from the right in the Gray code combination changes. Relay C operates. Relay D remains operated. The operation of relay C now connects resistor 4R to potential source $E_1$. Relay D when remaining operated while relay C is operated switches resistor 8R so that it is now connected in parallel with resistors R and 2R in series with potential source $E_0$ in the potentiometer circuit. Thus the conditions of the resistor elements individual to relays C and D for numeral 2 in the conventional binary combination are reversed with respect to their conditions for number 1 of the conventional binary combination.

The two right-hand columns in Fig. 4 show the manner in which the resistors are arranged for each combination. Analysis of these and the other columns in Fig. 4 will disclose that the transitions from each number to the next higher number effect a translation from the Gray code to the conventional binary code in accordance with the translating rule mentioned in the foregoing.

Reference to Fig. 3 shows the equivalent circuit of Fig. 2. In this figure $R_0$ represents the effective resistance connected directly to potential source $E_0$ and $R_1$ represents the effective resistance connected directly to $E_1$ in Fig. 2.

Refer now to Fig. 3. We have assumed that $E_0$ and $E_1$ are equal in magnitude and connected in series aiding relationship, so for the sum of the two voltages connected across $R_0$ and $R_1$ we can substitute 2E. We have assumed also that the magnitude of resistor $R_1$ is inordinately large relative to that of $R_0$ and $R_1$. Then, disregarding the very small current through $R_1$, for I, for the current through $R_0$ and $R_1$ in series, we have $$I=\frac{2E}{R_0+R_1}$$

For the voltage at the junction between $R_0$ and $R_1$, we have $$V=E-\frac{2ER_0}{R_0+R_1}$$

$$=\frac{E(R_0+R_1)-2ER_0}{R_0+R_1}$$

$$=\frac{E(R_1-R_0)}{R_1+R_0}$$

In order to obviate the necessity for computation by the reader of each of the arrangements in the tabulation in Fig. 4, and to show that the analog voltages obtained do in fact vary linearly for consecutive members throughout the range, the tabulations shown in Fig. 5 have been prepared. These show the magnitudes of the quantities required in the final mathematical expression in the foregoing for each of the groupings of the resistances in the corresponding combination in Fig. 4 and the analog voltages corresponding to the conventional binary code combinations for each of the numbers from 0 to 15. It is apparent that the relationship is linear which permits direct control of linearly responsive indicators. By this is meant that the slope of a curve defining the relationship between magnitude of potential and magnitude of a corresponding quantity for all of said code combinations is a constant.

What is claimed is:

1. A code signal converter having a source of multi-element, two-condition binary code signal combinations in accordance with the Gray code, a total of one relay in said converter individual to each of said elements, a single individual winding on each of said relays, a first and a second set of transfer contacts only on each of said relays, each of said sets consisting of a break contact, a make contact and an individual armature arranged to engage said break and make contacts alternately, a total of one lumped resistor individul to each of said relays, each of said resistors connected directly to one of said sets of contacts on its individual relay, said resistors directly interconnectable by paths extending directly through said contacts to form a variable potentiometer having a first and a second potential source connectable to outer terminals thereof, means for impressing Gray code signal combinations, from said signal source, on said windings, means responsive to said impressing of combinations in said Gray code for controlling said two sets of transfer contacts so as to set up corresponding combinations in accordance with the conventional binary code thereon, and directly interconnecting said resistors in said paths between said first and said second potential sources to produce linearly varying potentials for code combinations defining linearly varying numbers.

2. A translator for multielement, two-condition permutation Gray code signal combinations, said translator having a total number of magnetic relay switch controls equal to the number of signal elements in any one of said multielement combinations, one of said switch controls individual to each of said elements, said code characterized in that a single switch control in said receiver is actuated on transitions between all consecutive combinations defining quantities differing by unit amounts, said translator for translating said combinations into analog voltages varying linearly for all of said consecutive transitions responsive to the impressing thereon of said combinations, said translator, in addition to said switch controls, consisting of a two-branch potentiometer having variably disposable lumped impedance elements in said branches and a common load resistor, a total of one of said impedance elements individual to each of said switch controls, each of said switch controls having a total of two transfer combinations for reversing the disposition of its said individual impedance element in the arms of said potentiometer and for reversing the disposition in said arms of said impedance elements individual to controls of lower order in the combination, each of said impedance elements connectable directly to said transfer combinations on its individual switch control.

3. In a signaling system, a source of signals in accordance with Gray binary code combinations, a switching circuit, said circuit having a total of one electromagnetic relay individual to each signal element of said code, each of said relays having a total of two sets of transfer contacts thereon, a total of one lumped resistor individual to each of said relays, each of said resistors connected directly to a contact on its respective relay, a load resistor common to said resistors, a source of positive potential and a source of negative potential, means for impressing said combinations on said relays directly to actuate said contacts, said resistors responsively interconnectable through said direct connections between said sources so as to produce linearly varying voltages when said Gray combinations are applied in numerical order.

4. A multi-element two-condition permutation Gray code to conventional binary code translator and a conventional binary permutation code analog voltage generator responsive to said translator, said translator and said generator both integrated into a unitary relay circuit, said unitary circuit having a total number of relays equal to the number of elements to be translated, one of said relays individual to each translatable element, each said relay responsive to an individual element of said Gray code impressed thereon, each of said relays having a total of two sets of transfer contacts, each of said sets consisting of one armature and a cooperating make contact and break contact, said unitary circuit having a total number of resistors equal to the number of elements to be translated plus one common resistor, one of said resistors individual to each said relay connected directly to an armature on its respective relay, a source of potential, said relays responsive to the impressing of Gray code permutations thereon for cooperatively actuating said contacts to effect said translation, said resistors individual to said relays and said common resistor and said source of potential being directly interconnectable through said actuated contacts, to generate an analog voltage corresponding to the conventional binary code permutation corresponding to said translation.

5. A signal code translator for translating multi-element two-condition signal permutations in accordance with a first code, said code the Gray code, in which code a single signal element is changed in transitions between permutations defining consecutive quantities, into corresponding permutations in accordance with a second code, said second code being the conventional binary code, and an analog voltage generator for generating analog voltages corresponding to the translated permutations in said second code, said translator and said generator combined in a single unitary relay controlled potentiometer circuit, said circuit having a total number of relays equal to the number of elements in either of said codes, each of said relays having a total of two transfer contact combinations directly responsive to permutations in accordance with said first code, said potentiometer consisting of a potential source and a first group of lumped impedances whose total number is equal to the number of said relays, connected individually directly to said contact combinations, and a second lumped impedance, common to all of said first impedances, responsive to said relays, to effect said translation and said generation substantially simultaneously in a single switching operation.

References Cited in the file of this patent

UNITED STATES PATENTS

| | | |
|---|---|---|
| 2,023,221 | Fischer | Dec. 3, 1935 |
| 2,369,474 | Luhn | Feb. 13, 1945 |
| 2,538,615 | Carbrey | Jan. 16, 1951 |
| 2,571,680 | Carbrey | Oct. 16, 1951 |
| 2,630,481 | Johnson | Mar. 3, 1953 |
| 2,632,058 | Gray | Mar. 17, 1953 |
| 2,660,618 | Aigrain | Nov. 24, 1953 |
| 2,685,084 | Lippel | July 27, 1954 |
| 2,714,204 | Lippel | July 26, 1955 |
| 2,718,634 | Hansen | Sept. 20, 1955 |
| 2,733,432 | Breekman | Jan. 31, 1956 |
| 2,758,788 | Yaeger | Aug. 14, 1956 |

FOREIGN PATENTS

| | | |
|---|---|---|
| 731,650 | Great Britain | June 8, 1955 |

OTHER REFERENCES

Foss: I.R.E. Transactions, December 1954, pp. 1–6.